Nov. 15, 1966 W. M. SHARP, JR 3,285,384
SYSTEM FOR DETECTING IRREGULARITIES IN TYPING TECHNIQUE
Filed Dec. 18, 1963 5 Sheets-Sheet 1

INVENTOR.
WALTER M. SHARP, JR.
BY
MAHONEY, MILLER & RAMBO
BY
ATTORNEYS

INVENTOR.
WALTER M. SHARP, JR.

BY
MAHONEY, MILLER & RAMBO
BY
ATTORNEYS

United States Patent Office 3,285,384
Patented Nov. 15, 1966

3,285,384
SYSTEM FOR DETECTING IRREGULARITIES IN TYPING TECHNIQUE
Walter M. Sharp, Jr., Columbus, Ohio, assignor to The Battelle Development Corporation, Columbus, Ohio, a corporation of Delaware
Filed Dec. 18, 1963, Ser. No. 331,441
3 Claims. (Cl. 197—187)

My invention relates to a system for detecting irregularities in typing technique. It has to do, more particularly, with means which can be applied to a typewriter to produce angular rather than straight typed lines on the copy typed in the typewriter in order that typing irregularities may be observed more readily.

According to my invention, I provide an attachment for typewriters of either the manual or electric type which will produce movement of the paper in a direction at a right angle to the normal direction of relative travel of the type and paper. Usually, the paper will be moved vertically or at a right angle to the horizontal axis of the platen of the typewriter. In most typewriters, the platen moves with the carriage in the direction of its axis relative to the type but in at least one new make of electric typewriter, the platen is stationary and the type-carrying member moves with a carriage in a direction parallel to the axis of the platen. Consequently, according to my invention, the attachment moves the paper relative to the type in a direction at a right angle relative to its normal direction of movement relative to the type and simultaneously with such normal movement. The combined angular movement resulting from movement in the two directions indicated will produce angular typed lines on the paper. I have found that by producing these angular lines on the paper, for example, by vertical movement of the paper as the typewriter types horizontally which results in inclined lines, irregularities in the typing would be indicated by vertical spacing in the resulting inclined or diagonal lines.

In the accompanying drawings, I have illustrated examples of attachments for producing the inclined typed lines on the paper in the typewriter and the nature and usefulness of such lines but it is to be understood that details of the structures of the attachments may be varied without departing from basic principles of the invention.

Figure 1:
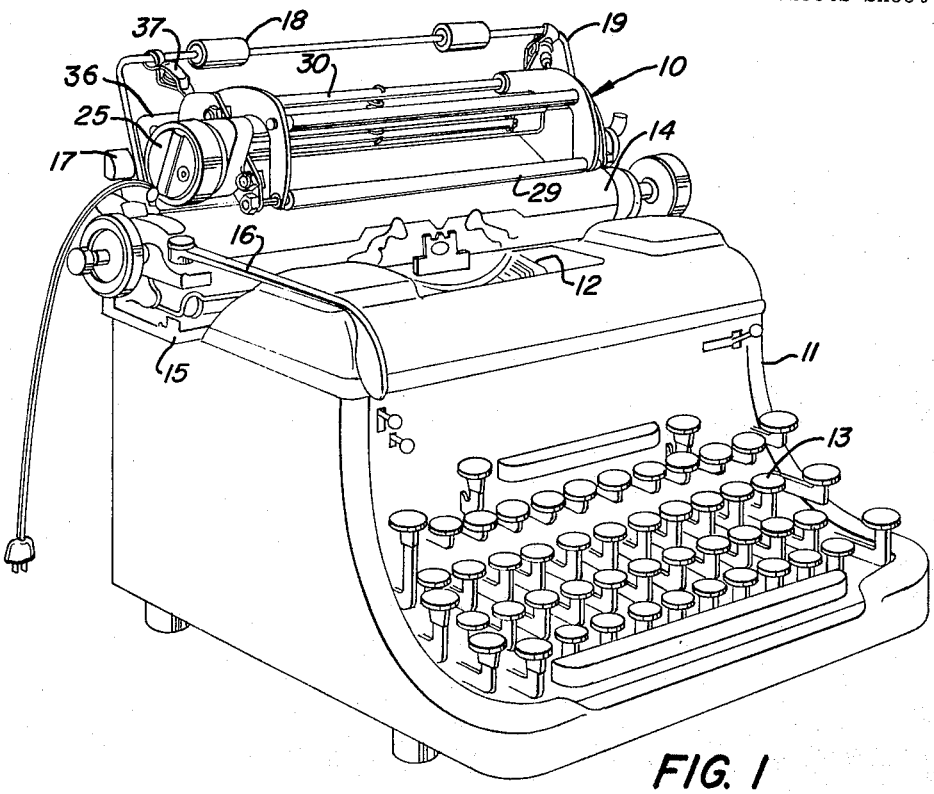
FIGURE 1 is a perspective view of a manual typewriter to which an attachment, according to my invention, is applied.

With reference to the drawings, in FIGURES 1 to 5 I have illustrated an attachment 10 embodying my invention and which is applied to a manual typewriter in which the carriage carries the platen and moves relative to the group of type bars in the direction of the axis of the platen. As is well understood, most typewriters, even electric typewriters, are made in this manner. The typewriter illustrated is shown as comprising the base or housing 11 with the type bars indicated as a group at 12, and the type bars being actuated by a group of keys 13 in the usual manner. The platen roller is shown at 14 and is disposed transversely at the upper rear portion of the housing being mounted for rotation about its own axis on a carriage 15 which is mounted for transverse reciprocation on the housing. The platen 14 can be released for free rotation from its control or advancing ratchet mechanism 16 by means of the usual finger lever 17. The usual paper guide rollers 18 are provided on the bail member 19 which is pivoted to the opposite ends of the carriage 16 for vertical swinging movement relative thereto.

The attachment 10 in this form is mounted on the carriage 15 in association with the platen and is adapted to pull the paper upwardly over the platen as the typing progresses and during the transverse or horizontal movement of the carriage 15 which moves the platen axially. During this time, the platen will be freely rotatable and the paper bail guide 19 will be in its upward and rearward position as shown in FIGURE 1.

The attachment 10, as shown best in FIGURES 2–5, is adapted to be mounted on and to be movable with the carriage 15. It is shown as comprising the upright side support plates 20 which are disposed in laterally spaced parallel relationship and are held in that relationship by means of a lower rigid rod 21 and an upper rigid rod 22 fixedly connected to the plates with the axes of the rods in parallel relationship. The one side plate 20, the left-hand one as shown, carries a small electric driving motor 25, which drives a shaft 26 that extends between the plates 20 and is rotatably supported thereby. This shaft 26 has keyed thereto a paper-driving roller 27, the shaft axis being disposed parallel to the rod 21.

The rod 21 serves also as a pivot rod for a paper-gripping frame which includes the upwardly and rearwardly curved side support arms 28. These arms are pivoted on the rod 21 for vertical swinging movement and are suitably positioned thereon in axially spaced relationship. Between the lower ends of these arms and positioned rotatably on the rod 21 is an idler paper-guide roller 29. The opposite or rearward and upper ends of the arms 28 are rigidly connected together in parallel spaced relationship by means of a connecting rod 30 which is parallel to the rod 21. Intermediate the rods 29 and 30 and parallel thereto, the arms 28 carry a shaft or rod 31 upon which an idler paper-gripping roller 32 is mounted between the arms.

A tension spring 33 is connected between the rods 22 and 30 and normally pulls the roller 32 rearwardly into engagement with the roller 27. To move these rollers apart to receive paper, it is merely necessary to actuate a finger lever 34 which is outwardly of one of the plates 20, for example, the one at the right. This will swing a yoke or bail 35 which has its outwardly extending ends pivotally mounted in the opposed plates 20. The yoke is so formed that when so pivoted, its central transverse part will engage the inner edges of the arms 28 and swing them upwardly and forwardly. This will, consequently, swing the arms 28 about the axis of the rod 21 and move the roller 32 forwardly away from the roller 27. As the lever 34 is released, the spring 33 will serve to move the roller 32 back into contact with the roller 27.

Figure 3:
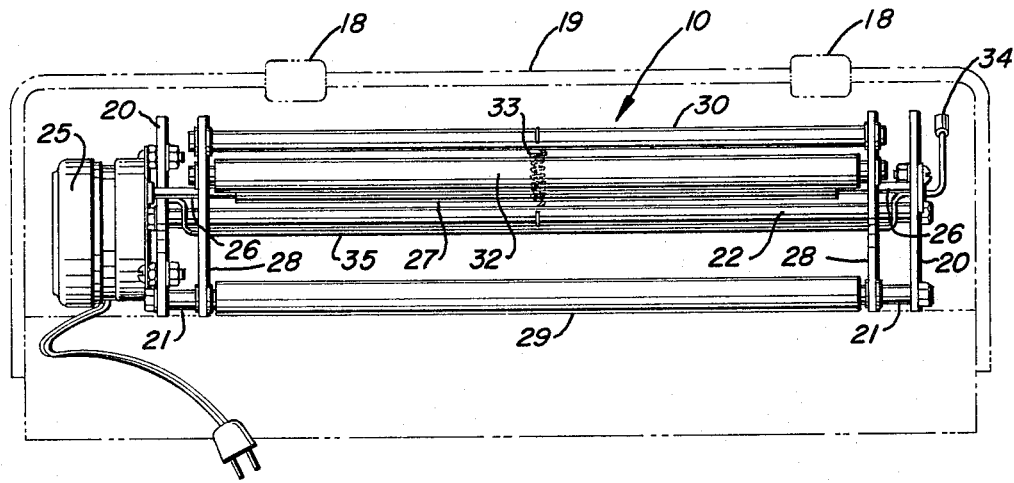
FIGURE 3 is a front elevational view of the attachment.
Figure 4:
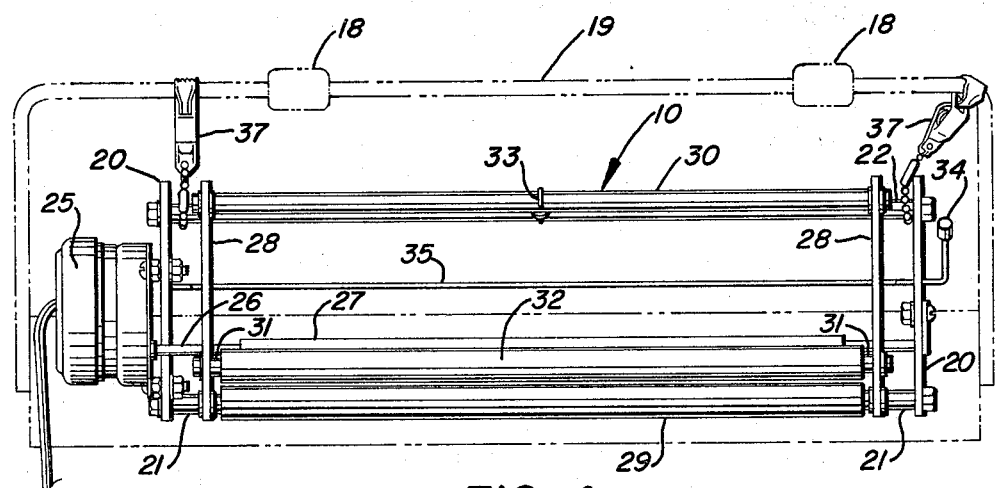
FIGURE 4 is a plan view of the attachment.
Figure 5:
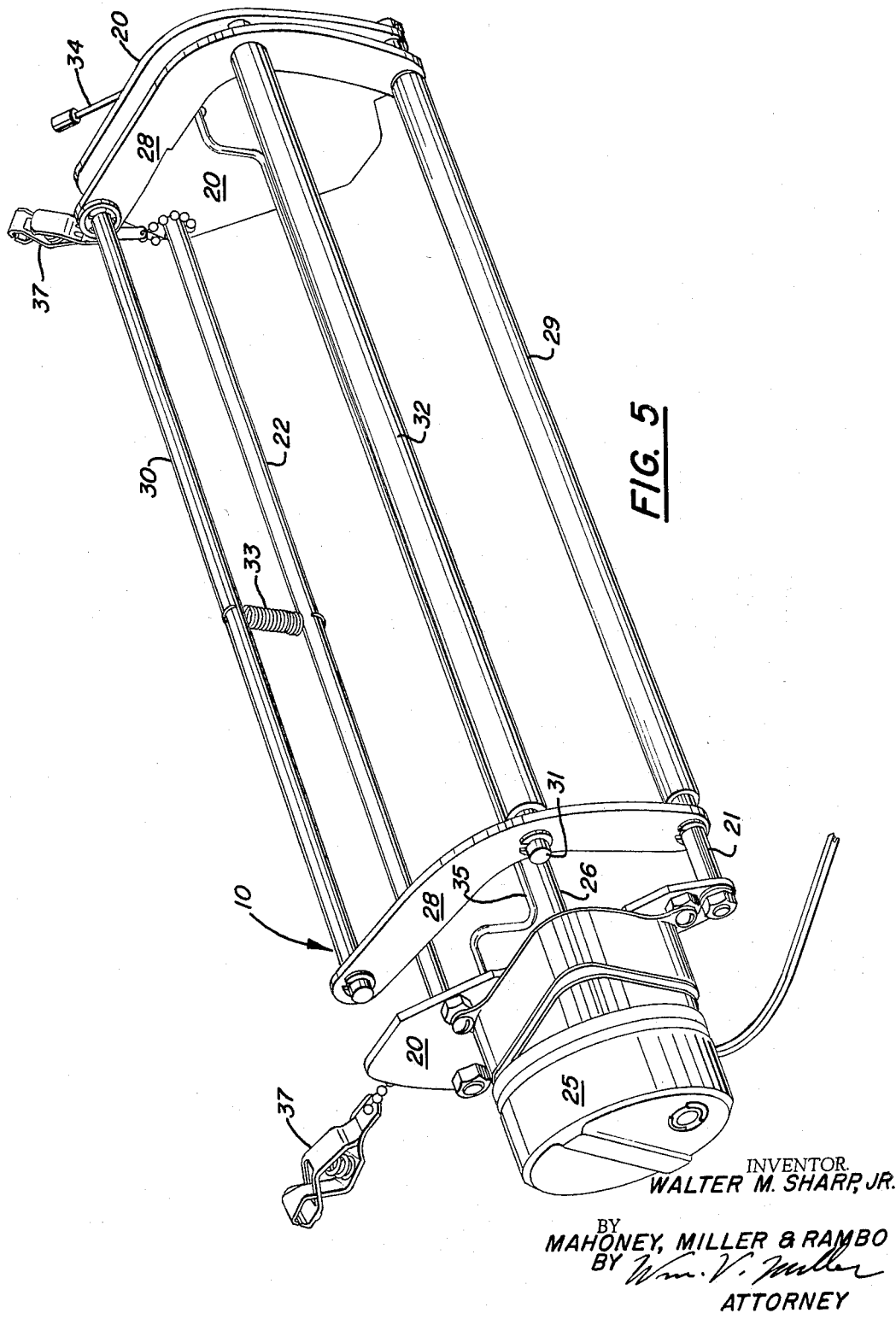
FIGURE 5 is a perspective view of the attachment.

In the use of this attachment 10, it is rested on the carriage 15 with the lowermost roller 29 in contact with the platen 14 which at this time is released for free rotation. The edges of the plates 20 are so shaped that they will also engage the platen and the rearwardly inclined plate 36 which carries the margin gauge. The paper-guide bail 19 will be swung upwardly at this time as indicated in FIGURES 1, 3 and 4. Clips and chains 37 may be carried by the rod 22 of the attachment and be connected to the bail 19 to prevent displacement of the attachment from the carriage 15.

Figure 2:
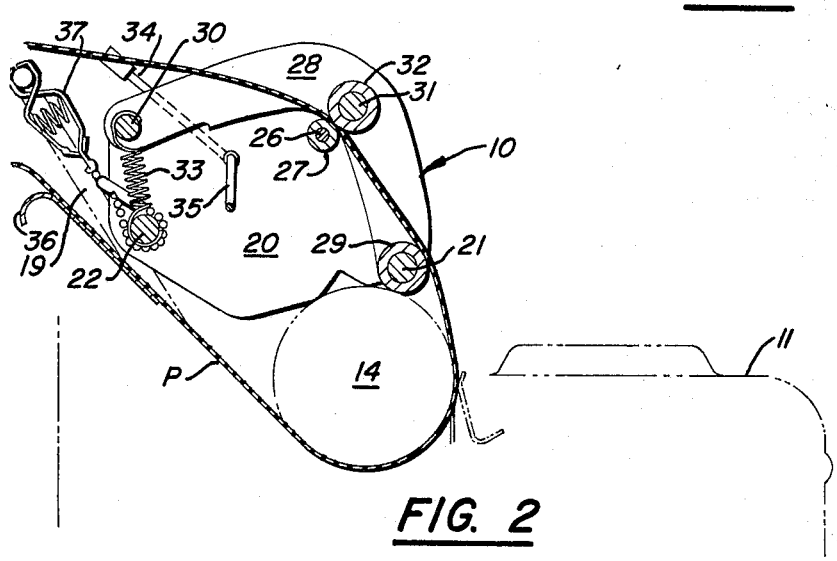
FIGURE 2 is a transverse vertical sectional view through the attachment showing it schematically associated with the typewriter.
Figure 7:
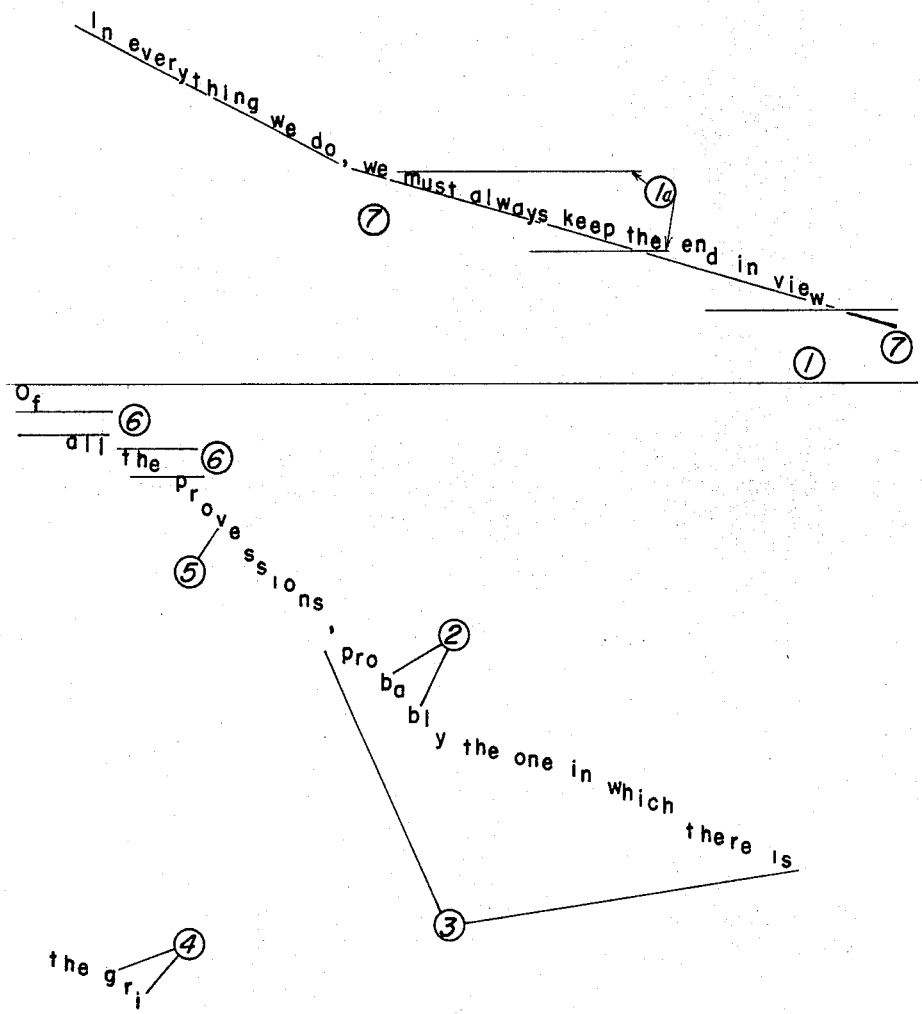
FIGURE 7 illustrates lines typed by use of a typewriter having my attachment thereon and indicating by reference characters certain irregularities in the typing which are more evident when the typed lines on the paper are inclined.

With the attachment positioned as indicated, the paper P, as indicated in FIGURE 2, is placed in the typewriter in the usual manner except that the platen is subsequently released and the guide 19 is swung upwardly as previously indicated. The paper is passed upwardly over the idler guide roller 29 and between the rollers 27 and 32 which will be spaced apart at this time by actuation of the lever 34. Then the lever is released to cause the roller 32 to grip the paper against the roller 27. Subsequently, by controlling the motor 25, the paper is pulled vertically over the platen 14. Therefore, if the motor is driven continuously, and the typewriter is used in the normal way for a selected period, the carriage 15 will move horizontally relative to the body of type bars 12 and simultaneously the paper will be pulled vertically relative thereto. The result will be that inclined lines will be typed on the sheet of paper P as indicated in FIGURE 7. The attachment, by producing the inclined lines, detects the following indicated points, for example, the numbers referring to the positions on the lines of FIGURE 7 where these points are evident:

(1) The amount of time taken to throw the carriage (measured in terms of lost strokes, as between equidistant lines 1a).

(2) Difficult letters for the student (indicated by vertical spacing before the striking of a letter).

(3) Difficult letter combinations and their effect upon typing speed and rhythm.

(4) The indirect cause of error (effort expended to strike difficult letter may result in error of following letter).

(5) Reaction to an error in terms of loss of speed and rhythm.

(6) The number of strokes lost by looking at the copy.

(7) Increase and decrease of speed per line during the timed writing (by the angle of the line).

The previously described attachment is for use on typewriters where the carriage moves axially with the platen. However, my invention is also applicable to that type of machine where the platen does not move axially but a carriage, having a type member thereon, moves in a direction parallel to the axis of the platen. Thus, broadly my invention involves moving the paper over a platen at the same time that the platen and type move relatively in the direction of the axis of the platen as in normal typing.

Figure 6:
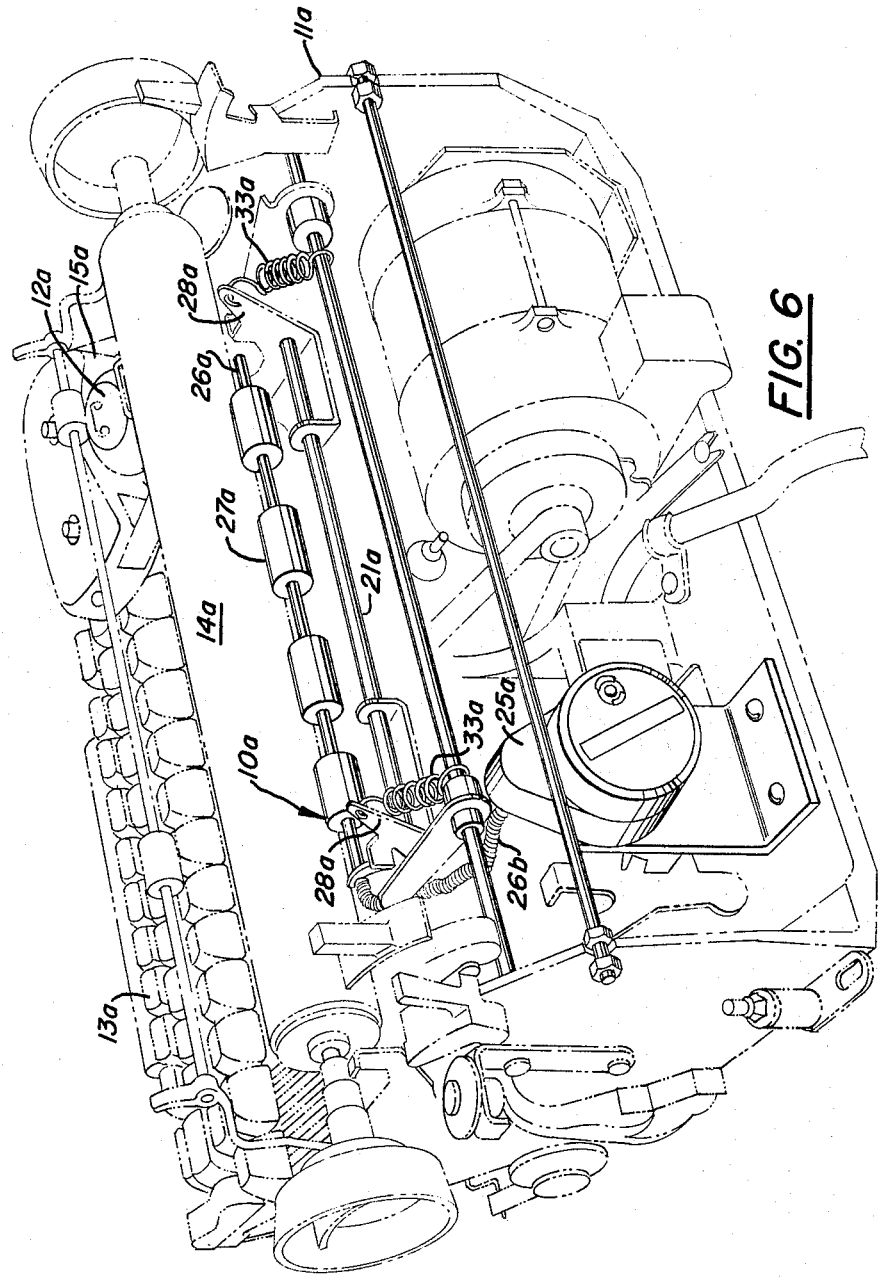
FIGURE 6 is a perspective view illustrating an attachment for an electric typewriter of the make which has a fixed platen and traveling type member on a carriage movable relative to the platen.

An example of a machine where the type member is mounted on a carriage and moves relative to the platen is illustrated in FIGURE 6. The platen is shown at 14a and is fixed transversely although it can rotate about its own axis. The carriage 15a is reciprocably mounted on the base 11a of the machine for movement in a direction parallel to the axis of the platen 14a. The carriage carries the type member 12a which is of the spherical type and which is actuated by the keys 13a.

My attachment in this instance is indicated generally at 10a and is disposed behind the transversely fixed platen 14a. It comprises a plurality of paper-engaging and driving rollers 27a keyed on a drive shaft 26a. The shaft 26a is carried by supporting arms 28a which are pivoted on a rod 21a fixed on the base 11a. Springs 33a normally bias the rollers 27a against the platen 14a. The shaft 26a is driven by a flexible shaft 26b from a small electric motor 25a which is mounted at the rear of the base 11a.

Thus, ordinarily the rollers 27a will be held out of contact with the platen 14a by the usual off-center or cam lock mechanism. However, when released, the springs 33a will move the rollers 27a against the platen and if the paper is passed between the platen and the rollers and the motor 25a is energized, the paper will be moved vertically as the type member 12a moves across the platen. The resulting typed lines will be inclined as before.

It will be apparent that this invention provides a method or system of detecting irregularities in typing by creating angular or diagonal typed lines on the paper as the typist types in the usual manner. These lines are created by moving the paper over the platen as the platen and type move relatively in the direction of the axis of the platen. These inclined or diagonal lines readily indicate to a teacher or other qualified observer various irregularities in the typing.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination in a typewriter having a base, a platen mounted on said base with a central, horizontally disposed axis extending transversely thereof, said platen having a peripheral surface extending around said axis, a set of type cooperating with said peripheral surface of the platen, said platen and said type being mounted on said base for relative movement in the direction of the axis of the platen from an initial starting position at the left of said base to a final stopping position at the right of said base, a set of keys on said base located in front of said platen operatively connected to the set of type for actuating the type and producing said relative axial movement of said platen surface and said set of keys toward the final stopping position at the right of said base, means for supporting a sheet of paper in association with the platen surface in a position fixed axially thereof but free to advance forwardly and upwardly thereover at a right angle to the axis of the platen and so as to be engaged by the type when actuated by the keys, said platen and keys being mounted on said base for relative return movement from said final stopping position at the right of said base to said initial starting position at the left of said base; sheet-advancing means independent of the actuation of the keys and said return movement for moving the sheet continuously at a constant predetermined rate upwardly over the platen surface in engagement therewith and at said right angle relative to the axis of the platen so that as the keys are actuated during such advancing and axial movement and as the platen and keys are returned to their initial relative starting position, a combination relative movement of the sheet and type is produced both horizontally in the direction of said platen axis and upwardly at a right angle thereto, thereby resulting in the typing of a variable angular line on the sheet which slants at an inclined angle from left to right and which has characteristics dependent on the skill of the typist actuating the typewriter by said keys and controlling said returns movement to said initial starting position.

2. The combination of claim 1 in which said sheet-advancing means includes means for gripping the sheet and holding it in engagement with the platen surface and a continuous drive electric motor for moving the sheet over the platen surface.

3. In combination in a typewriter having a base, a platen mounted on said base with a central axis about which the platen is mounted for rotation, said platen having a peripheral surface, a set of type cooperating with said peripheral surface of the platen, said platen and said type being mounted on said base for relative movement in the direction of the axis of the platen from an initial starting position to a final stopping position, a set of keys operatively connected to the set of type for actuating the type and producing said relative axial movement of said platen surface and said set of keys toward the final stopping position, means for supporting a sheet of paper in association with the platen surface in a position fixed axially thereof but free to advance thereover at a right angle to the axis of the platen and so as to be engaged by the type when actuated by the keys, said platen and keys being mounted on said base for relative return movement from said final stopping position to said initial starting position; sheet-advancing means independent of the actuation of the keys and said return movement for moving the sheet continuously at a constant predetermined rate over the platen surface in engagement therewith and at said right angle relative to the axis of the platen so that as the keys are actuated during such advancing and axial movement and as the platen and keys are returned to their initial relative starting position, a combination relative movement of the sheet and type is produced both in the direction of said platen axis and at a right angle thereto, thereby resulting in the typing of a variable angular line on the sheet which has characteristics dependent on the skill of the typist actuating the typewriter by said keys and controlling said return movement to said initial starting position.

References Cited by the Examiner

UNITED STATES PATENTS

| | | | |
|---|---|---|---|
| 1,158,985 | 11/1915 | Cooper | 197—1 |
| 1,246,983 | 11/1917 | Myers | 197—82 |
| 1,619,045 | 3/1927 | Waldheim | 197—127 |
| 1,827,451 | 10/1931 | Aillaud | 197—8 |
| 2,111,619 | 3/1938 | Fleming | 197—127 |
| 2,274,834 | 3/1942 | Ira | 197—138.5 |
| 2,348,744 | 5/1944 | McMurry. | |
| 2,431,043 | 11/1947 | Jackson | 197—113 X |
| 2,494,192 | 1/1950 | Parker | 197—8 |
| 2,578,771 | 12/1951 | Zint | 197—82 |
| 2,717,688 | 9/1955 | Brooks | 197—187 |
| 2,799,551 | 7/1957 | Nitschke | 197—113 X |

FOREIGN PATENTS

| | | |
|---|---|---|
| 16,147 | 1904 | Great Britain. |
| 25,671 | 1904 | Great Britain. |

ROBERT E. PULFREY, *Primary Examiner.*

DAVID KLEIN, *Examiner.*

E. T. WRIGHT, *Assistant Examiner.*